United States Patent [19]
Williams

[11] Patent Number: 6,003,101
[45] Date of Patent: Dec. 14, 1999

[54] EFFICIENT PRIORITY QUEUE

[75] Inventor: Byron Allen Williams, Chapel Hill, N.C.

[73] Assignee: International Business Machines Corp., Armonk, N.Y.

[21] Appl. No.: 09/116,327

[22] Filed: Jul. 15, 1998

[51] Int. Cl.[6] ..................................................... G06F 13/18
[52] U.S. Cl. .......................... 710/112; 710/100; 710/111; 707/100; 707/103; 709/213
[58] Field of Search ..................... 710/112, 100, 710/111; 709/213; 707/100, 103

[56] References Cited

U.S. PATENT DOCUMENTS

| | | | |
|---|---|---|---|
| 4,320,455 | 3/1982 | Woods et al. | 364/200 |
| 5,521,916 | 5/1996 | Choudhury et al. | 370/60.1 |
| 5,752,028 | 5/1998 | Ellacott | 707/103 |
| 5,870,396 | 2/1999 | Abu-Amara et al. | 370/413 |
| 5,903,776 | 5/1999 | Larson | 710/54 |

*Primary Examiner*—Ayaz R. Sheikh
*Assistant Examiner*—Eric S. Thlang
*Attorney, Agent, or Firm*—Jerry W. Herndon

[57] ABSTRACT

A priority queue structure and algorithm for managing the structure which in most cases performs in constant time. In other words, most of the time the inventive algorithm performs its work in an amount of time that is independent on the number of priority classes or elements that exist in the queue. The queue itself consists of a linked list of elements ordered into subqueues corresponding to priority classes, with higher priority subqueues appearing earlier in the queue. An array of priority pointers contains an entry for each subqueue that points to the last element of each subqueue. Elements are removed for processing from the top of the queue. Removal takes constant time. Items are inserted into an appropriate subqueue by linking it at the end of its respective subqueue. The only case that requires a variable amount of time depending on the length of the queue and the number of priority classes occurs when an item is added to an empty subqueue which is of lower priority than the element at the top of the queue. All subsequent additions to that subqueue consume constant time until the subqueue becomes empty once again. A feature of the invention prevents the possibility of perpetually locking out lower priority items in the queue by promoting the priority of a preempted item residing directly below a newly inserted item on the queue.

8 Claims, 4 Drawing Sheets

EFFICIENT PRIORITY QUEUE

TECHNICAL FIELD

The invention relates generally to the field of data processing and particularly to the art of queuing requests for service and serving such requests on a designated priority basis.

BACKGROUND OF THE INVENTION

A priority queue is a queue in which queue elements, items that each represent a task to be served, are stored and serviced according to different levels of priority that are assigned to different ones of the queue elements. There are a number of known ways of managing priority queues. The most obvious way is to assign a separate queue to each priority class and service each queue separately according to its priority class. This method has serious performance limitations when there are more than just a few priority classes. Algorithms for managing priority queues are described in many text books, such as DATA STRUCTURES and ALGORITHMS, Aho et al, Addison-Wesley, 1983, Section 4.10–4.11; and ALGORITHMS, Sedgewick, Addison-Wesley, 1983, Chapter 11.

Sedgewick describes the conventional data structure, called a heap, heretofore considered the most efficient for a priority queue able to handle an unlimited number of priority classes. A heap is a tree structure with each node of the tree having at most two child nodes. Nodes represent transactions and each has a priority class. Nodes are added at the first available position progressing left to right and top to bottom through the heap. The heap must follow the rule that a parent node can have a priority class which must be equal to or greater than the priorities of its children. When a node is added to the first available position left to right and top to bottom, the above rule respecting the priorities of parents and children may be broken. If this is true after a node is added, the algorithm then exchanges the added node with its parent. If the rule is still broken with respect to the parent and its parent, the exchange is repeated for these two nodes, and so on up the tree, until all nodes satisfy the rule. It can be shown that this heap algorithm performs in O(Log N) time, where N represents the number of nodes of the heap. In many real implementations of priority queues and heaps, the number of priority classes can become quite large, often in the hundreds. In such situations, it is often true that the processing time for managing priority queues and heaps still represents too much of system resources. Thus, a need exists to further improve the operation of priority queues.

SUMMARY OF THE INVENTION

The invention is a new priority queue structure and algorithm for managing the queue structure which in most cases performs in constant time. In other words, most of the time the inventive algorithm performs its work in an amount of time that is not dependent on the number of priority classes that might exist or the number of elements in the queue. This is a considerable improvement over the heap when the number of queue elements may be large and over separate priority queues when the number of priority classes are large.

A single linked list queue is used to implement the queue. The queue is ordered into subqueues corresponding to priority classes, with higher priority subqueues appearing earlier in the queue. An array of priority pointers contains an entry for each subqueue that points to the last element of each subqueue. Elements are removed for processing from the top of the queue. Removal takes constant time. Items are inserted into an appropriate subqueue by linking it at the end of its respective subqueue. The only case that requires a variable amount of time, depending on the contents of the queue and the number of priority classes, occurs when an item is added to an empty subqueue which is of lower priority than the element at the top of the queue. All subsequent additions to that subqueue consume constant time until the subqueue becomes empty once again.

Because items are serviced from the top of the queue, there is a possibility of locking out lower priority items in the queue. This is avoided by a feature of the invention that promotes the priority of an preempted item residing directly below a newly inserted item on the queue.

Using the above queue data structure, it can be shown that elements can be linked into a nonempty subqueue in constant time. That is, the time required to accomplish this linking does not vary as the queue or subqueue lengthens. It can also be shown that all but one of the operations required to link an element into an empty subqueue can also be accomplished in constant time. As mentioned above, the one exception to this occurs when the first element in the queue is of a higher priority than the new element being linked. It is an advantage of the inventive arrangement that when this condition occurs, the search time required to insert the new element into the queue improves (lessens) in proportion to its priority. In other words, the insertion of higher priority elements consume less time than lower priority elements. Thus, most queuing operations occur in constant time in this system, and those operations that consume time dependent on the contents of the queue and number of priority classes tend to optimize around the higher priority elements. This features offer great advantages over the known art whose performance worsens as queue length increases.

Additionally, servicing of the queue (removing of an element) is greatly improved over the prior art. In the present structure in which higher priority items are ordered from top to bottom in the queue, servicing of the queue is performed by merely removing the top element. In contrast, when separate queues are used for each priority class, the time required to service the queues is proportional to the number of queues; in the heap method, the top element is removed for servicing and the left-most child of this top element is made the new top element. At this point, the heap must be reorganized according to the above-discussed rule to insure that heap remains consistent. This operation takes O(Log N) time.

In the preferred embodiment, the structure includes a queue partitioned into subqueues corresponding to different priorities of elements to be serviced from the queue. The subqueues are ordered within the queue according to the respective priorities of the subqueues. A priority pointer array contains a pointer for each subqueue that points to the last entry in its respective subqueue. Each element of the queue comprises a next pointer to the next element in the queue, if any, and a back pointer which for each last entry of a subqueue points to the respective entry in the priority pointer array. When a new element arrives for insertion into the queue, the priority class of the new element is determined and the new element is inserted into the queue as the last entry of the subqueue corresponding to its priority class. The queue structure is periodically serviced by removing the top entry from the queue.

As part of queuing a new element, it is determined if the subqueue corresponding to the priority class of the new element is empty. If the subqueue is not empty, the back pointer of the present last element of the subqueue is cleared; the next pointer of the new element is initialized to point to the successor of the present last subqueue element; the next pointer of the present last element of the subqueue is initialized to point to the new element; the back pointer of the new element is initialized to point to the corresponding subqueue pointer of the priority pointer array; and the corresponding pointer of the priority pointer array is initialized to point to the new element.

If the subqueue is empty, the back pointer of the new element is initialized to point to the corresponding subqueue pointer of the priority pointer array and the corresponding pointer of the priority pointer array is initialized to point to the new element. Further, it is determined from the head pointer if the queue is empty and, if so, the head pointer is initialized to point to the new element. If the queue is not empty, it is determined if the priority class of the new element is higher than that of the first element on the queue. If this is true, the next pointer of the new element is initialized to point to the present element at the top of the queue, and the head pointer is initialized to point to the new element. If the priority class of the new element is not higher than that of the first element on the queue, the priority pointer array is searched for the first subqueue of priority higher than that of the new element that is not empty and the next pointer of the last element of that subqueue is initialized to point to the new entry. The next pointer of the new element is initialized to point to the next entry in the queue following the new element.

If the insertion of a new element preempts a present element in the queue, then the priority of the preempted element is promoted to prevent its possible lockout or excessively deferred processing by higher priority elements. When a new element is inserted, a priority counter field of the new element is initialized to a first priority value determined by a prescribed function of the priority class of the new element. The priority value is one of a set of priority values that are defined to reside in the priority class of the new element. The promotion of a preempted element involves setting the priority value of the preempted element to a higher priority value, then determining if the higher priority value of the preempted element is within the set of priority values that correspond to a higher priority class. If this is true, then the preempted element is relinked into the subqueue corresponding to the priority class of the higher priority value.

In the preferred embodiment the prescribed function is [priority value=$3^{X-1}$], where X is the priority class of a new element. The initial priority value of an element is the value calculated by the prescribed function. Thus, the initial an element is the value calculated by the prescribed function. Thus, the initial priority value of an element of priority 1 is 1. For a priority of 2, the initial priority value is 3 and the range of values within this priority class is 2–3. Similarly, for a priority class of 3, the initial value is 9 and the range of values is 4 to 9, and so on. In this arrangement, an element is promoted by decrementing its present priority value, preferably by the value of one.

It is understood that software intended for operation with a computer in accordance with the principles disclosed and claimed herein may be incorporated into various types of media, such as CD-ROM, floppy diskettes, etc. for distribution and that it is intended that certain claims encompass such modes of commercial exploitation of the invention.

DETAILED DESCRIPTION

Figure 1:
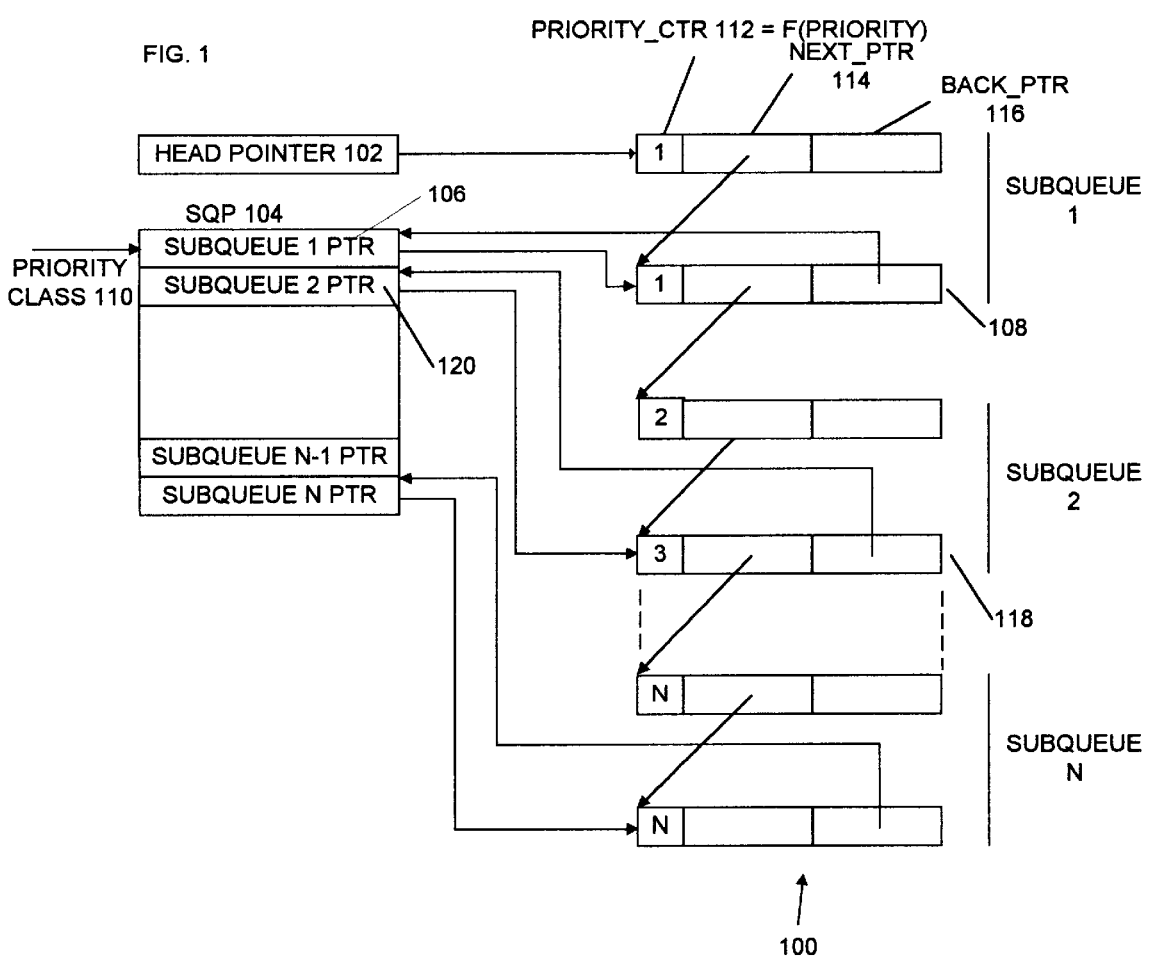
FIG. 1 illustrates an illustrative example of a priority queue data structure that may be used to practice the invention.

FIG. 1 shows an illustrative data structure of a priority queue arranged for processing in accordance with the principles of the invention. On the right of FIG. 1 is shown the element queue 100. As shown, the element queue is arranged into a plurality of subqueues 1 through N, where N is an arbitrary number equal to the number of element priority levels that might be present in any particular system. The priority levels are arranged top to bottom in the queue in the order of highest to lowest priority elements. Priority 1 is the highest priority, followed by priority 2, and so on down to N. Thus, any elements of priority 1 appear first in the queue, followed by elements of priority 2, and so on. Elements are added to the queue by linking or inserting them into their appropriate subqueue, typically at the bottom of a subqueue, as will be seen. The queue is serviced by removing the top element from the queue. A HEAD POINTER 102 always points to the top element of the queue. In addition, a Subqueue Priority Pointer table (SQP) 104 is an array of subqueue pointers also arranged in the descending order of priority of the subqueues. Each SQP array element points to the last element in a subqueue that corresponds to the same priority class as the SQP element. Thus, SQP subqueue 1 pointer 106, for example, points to queue element 108, which in the example of FIG. 1 is the last element in subqueue 1. When an element arrives for queuing, the priority class of the element is ascertained and that value is used, as at 110 in FIG. 1, to access the appropriate subqueue pointer in SQP to locate the end of the appropriate subqueue where the arriving element is to be linked into the queue.

With respect to the queue elements themselves, each element contains a priority counter field (PRIORITY_CTR) 112, a NEXT_PTR field 114 and a BACK_PTR field 116. NEXT_PTR 114 of a queue element points to the next element in the queue, irrespective of whether or not the next element begins a new subqueue. All elements of a subqueue, except the last subqueue element, contain no value in its field BACK_PTR 116. The last element of a subqueue contains a pointer that points to the address of the subqueue pointer in the SQP array 104. Thus, BACK_PTR 116 of element 118, which is the last element of subqueue 2 in the example of FIG. 1, points back to its SQP pointer 120.

As will be seen, PRIORITY_CTR 112 is used to age queue elements as they may be preempted by higher priority arriving elements so that any given element cannot be continually blocked from being serviced. The value that is initially stored in PRIORITY_CTR 112 of any given element when it is inserted into the queue is some appropriate function of the priority of the element (PRIORITY_CTR= F(PRIORITY). In the preferred embodiment, this function is illustratively PRIORITY_CTR=$3^{PRIORITY-1}$. Using this mapping function according to the preferred embodiment, the PRIORITY_CTR range maps into the value of 1 for priority 1 elements, into the range of 2–3 for priority 2 elements, into the range 4–9 for priority 3 elements, and so on. When an element is first linked into the queue, PRIORITY_CTR 112 is set equal to the highest value of the range that corresponds to the priority level. Thus, initially PRIORITY_CTR 112 is set to 1 for priority 1 elements, to 3 for priority 2 elements, to 9 for priority 3 elements, and so on. As will be seen below, as new elements are linked into the queue, a preempted element, the first element immediately below the new element in the queue, is promoted in priority by decrementing the value in its PRIORITY_CTR 112.

The above summarized queue structure can be used in any computer system in which elements, service requests, messages, and other similar types of things arrive and are queued for servicing according to some priority structure. For example, the present invention is used in IBM's Communication Server software. This software is typically used in a server computer that interfaces workstations to remote host computers and allows, for example, data transfer and data communications between the workstations and the server. Such a server computer might be implemented by an IBM PS/2 Model 95, for example. However, the invention can be advantageously implemented on a computer of any type where servicing of queue items is desired on a priority basis.

Figure 2:
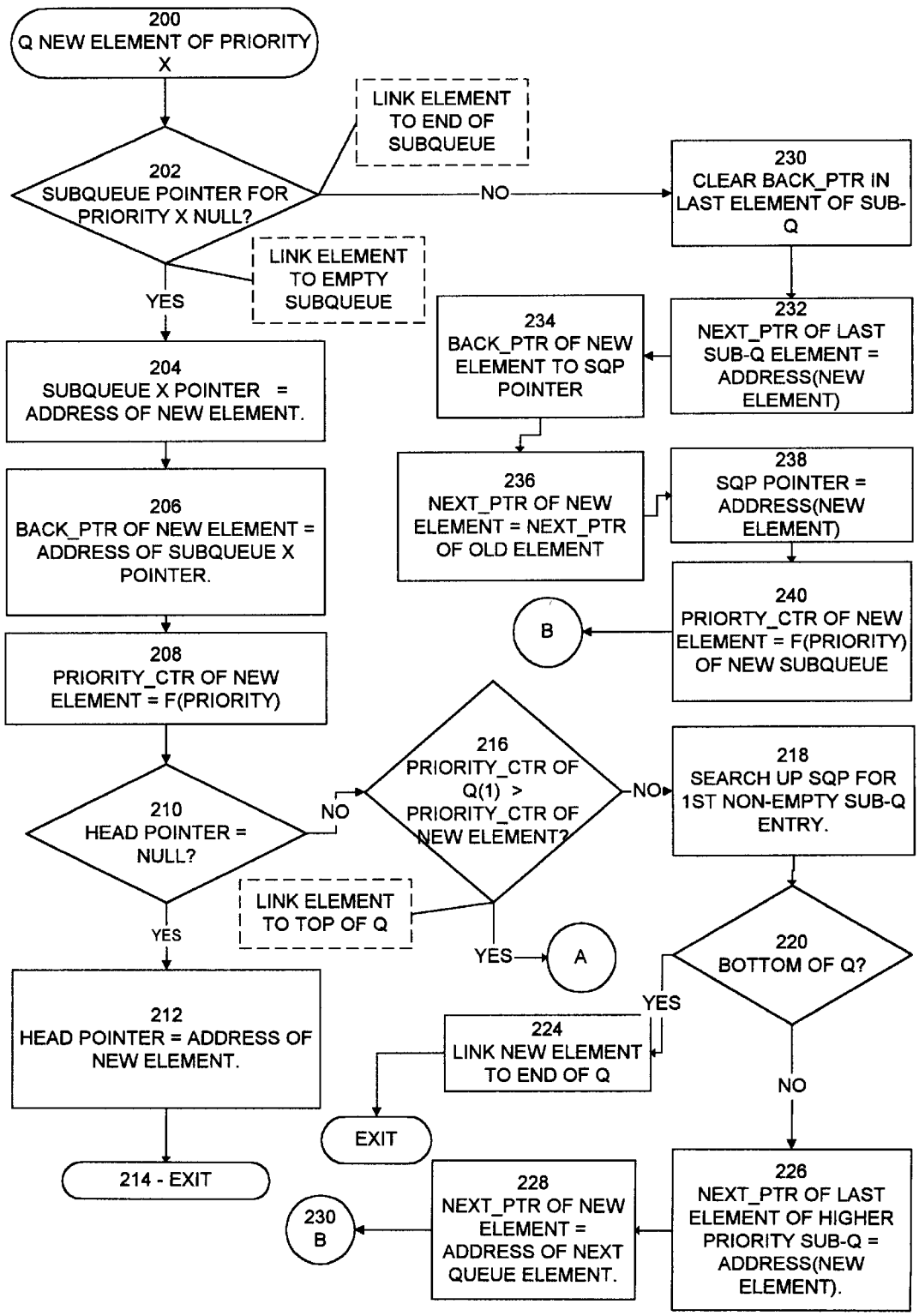
FIGS. 2 through 3 contain illustrative flowcharts of steps that are performed to link elements into the queue structure of FIG.
Figure 3:
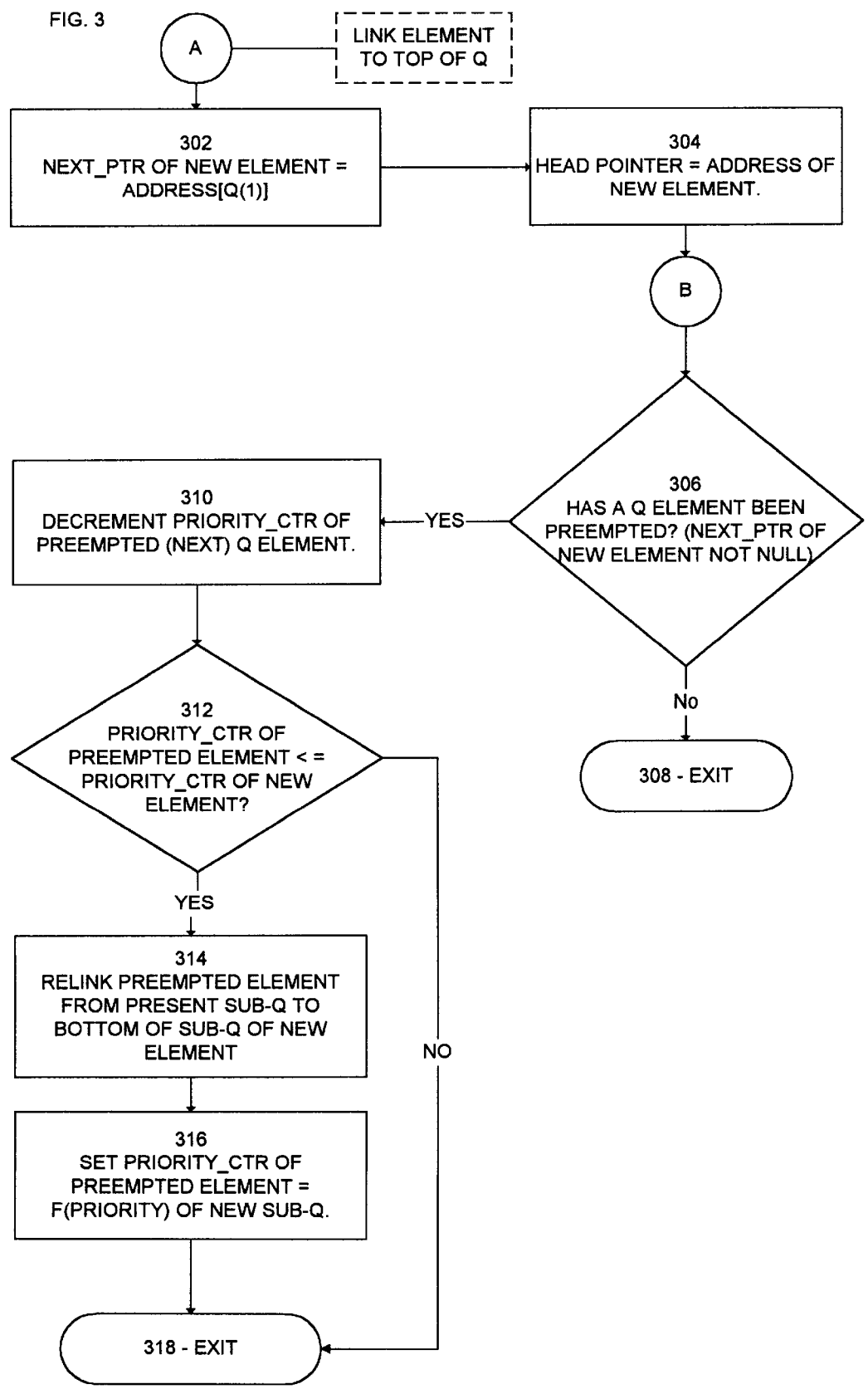

FIGS. 2 and 3 show the steps that are performed to link a new element into the queue. The starting point 200 in FIG. 2 is entered upon the arrival of a new element of priority X. At step 202, the priority of the new element is determined and used to access the SQP priority class pointer in array SQP. If the value of the SQP priority class pointer is null, meaning that the subqueue is empty, then step 204 is next executed. If the subqueue is not empty, step 230 is executed. Assuming at this point that the priority subqueue X is not empty, step 230 is executed. Preferably the new element is to be linked as the last element of subqueue X. This requires clearing BACK_PTR 116 of the present last element of subqueue X. This is accomplished by step 230. Step 232 links the new element into the queue by setting NEXT_PTR 112 of the present last subqueue member to point to the new element. Because the new element is the last element of the subqueue X, its BACK_PTR 116 must be set to point back to the Subqueue X array element of SQP 104. Step 234 accomplishes this. Step 236 sets NEXT_PTR of the new element to point to the successor of the old last element of the subqueue. Step 238 sets the value of the SQP 104 subqueue array element to point to the address of the new element. This establishes the new element as the last element in subqueue X and completes the linking of this element into the non-empty subqueue. Step 240 sets PRIORITY_CTR of the new element to the value F(PRIORITY) for this priority class. A glance at the steps 230–238 required to accomplish this quickly reveals that only constant time is required to accomplish this operation. Five things must always be accomplished, the BACK_PTR of the old and new elements must be initialized, NEXT_PTR of the last old element and the new element in the subqueue must be initialized, and the appropriate SQP subqueue pointer element must be initialized to point to the new last element in the subqueue. Clearly, these operations are always performed in constant time without dependence on the contents or length of the queue 100.

If we now assume that the subqueue X is empty when the new element arrives, then step 202 branches to step 204 rather than 230. In this case, the new element must be inserted into the queue as the only element of subqueue X. Because the new element is by definition the last element in the priority X subqueue, the priority X element of SQP must be initialized to point to this new element and BACK_PTR 116 of the new element must initialized to point back to the appropriate SQP 104 subqueue X element. Steps 204 and 206 accomplish this. Step 208 initializes PRIORITY_CTR 112 of the new element to the preferred aging function according to the priority X of the new element, $3^{X-1}$ in this preferred embodiment.

NEXT_PTR 114 of the previous element in the queue, if any, and NEXT_PTR 114 of the new element must now be initialized. Additionally, the preempted queue element following the new element, if any, must be properly aged (promoted in priority) to prevent its possible perpetual lockout. Step 210 determines if HEAD POINTER 102 is null, indicating that the queue 100 is empty when the new element arrived. If this is true, then there is nothing left to do except initialize HEAD POINTER 102. Therefore, if HEAD POINTER 102 is null at step 210, step 212 points HEAD POINTER 104 to this new element as required to make it the first element on the queue. Queuing is now complete and exit is made at step 214.

If the queue is not empty as determined at step 210, then step 216 determines if the priority of the first element of the queue 100 is less than the priority of the new element (PRIORITY_CTR of Q(1)>PRIORITY_CTR of the new element). If so, then the priority of the new element is higher than any other element in the queue and must be linked at the top of the queue accordingly. If this the case, step 216 branches to program label A in FIG. 3. At label A, since the new element is being linked to the top of the queue, its NEXT_PTR 114 is set at step 302 to point to the present top element Q(1) of the queue 100 and HEAD POINTER 102 is set to point to the new element. These steps insert the new first element on top of the queue. Next at label B in FIG. 3, the priority of the preempted old first element, if any, is now promoted in accordance with the invention. To accomplish this, step 306 determines if any queue element got preempted as a result of the new element. Step 306 accomplished this by determining if the NEXT_PTR 114 of the new element points to a succeeding element. If no, meaning that the new element is the last element in the queue 1100, then exit is made at 308. If NEXT_PTR 114 of the new element is pointing to an element, then that element has been preempted and step 310 promotes the priority of the element by decrementing the value of its PRIORITY_CTR 110. It should be noted that this promotion of priority of an element may or may not promote an element to a new priority class. Step 312 determines if the promotion results in a new priority class. It does this by determining if the new value of PRIORITY_CTR of the preempted element is equal to or less than that of the new element. If not, nothing remains to be done and exit is made at 318. As an aside, the priority count of a preempted element can become less than that of a new element when, for example, a number of elements have been inserted into a subqueue with empty subqueues below it and on each insertion the priority counter of a preempted element continually gets decremented until a priority empty subqueue becomes occupied. If the preempted element has been promoted to a higher priority class, then this preempted element must be relinked, preferably as the last element of the subqueue of its new priority class, and its PRIORITY_CTR 112 reinitialized to the value of F(PRIORITY CLASS). This is accomplished at step 314 and 316 of FIG. 3. Step 314 performs the relinking. This entails setting the SQP 104 pointer element that defines the priority of the promoted element to point to the promoted element, setting BACK_PTR 116 of the promoted element to point back to the SQP element and clearing BACK_PTR 116 of the new element (because it is being replaced by the preempted element as the last element of its subqueue. Step 316 reinitializes the value of PRIORITY_CTR of the preempted element. Note that if this operation is necessary, it is accomplished in constant time that is independent on the length of the queue.

Returning to step 216, if it is determined that the priority of the new element is not greater than the first element of the queue, then it is necessary to link the new element at an appropriate point within the queue in accordance with its priority. To accomplish this, the first queue 100 entry above this new entry must be found so that NEXT_PTR of that entry can be pointed to the new entry. Therefore, step 218 searches upward in SQP 104 beginning with the SQP array element for the priority of the new element to find the first nonempty subqueue of priority greater than that of the new element. This is the exceptional part of the algorithm that is dependent on the contents of the queue, ie, how many empty subqueues are present in SQP 104 between the priority level of the new element and the first nonempty subqueue found above it in SQP 104. If the priority of the new element is lower than any other element in the queue and the next higher priority class in SQP 104 is non-empty, then step 220 will determine that the new element is linked at the bottom of the queue. In this case, step 224 merely links the new element to the bottom of the queue by setting NEXT_PTR of the present last queue element to point to the new element, initializing the appropriate SQP 104 pointer element to point to the new element and by setting BACK_PTR of the new element to point back to the appropriate priority class pointer in SQP 104. If step 220 determines that the insertion point of the new element is not at the bottom of the queue, then step 226 inserts the new element into the queue immediately below the last element of the first subqueue that is found at step 218. This entails pointing that element to the new element, and setting BACK_PTR 116 of the new element and the priority class pointer in SQP 104 to point to each other. In the above operations, all but the search upwards in SQP at step 218 occur in constant time.

Any queue 100 element that has been preempted by the new element must be promoted in priority as priorly discussed. Therefore, at step 230 entry is made to program label B in FIG. 3 to perform the promotion as already discussed above.

Figure 4:
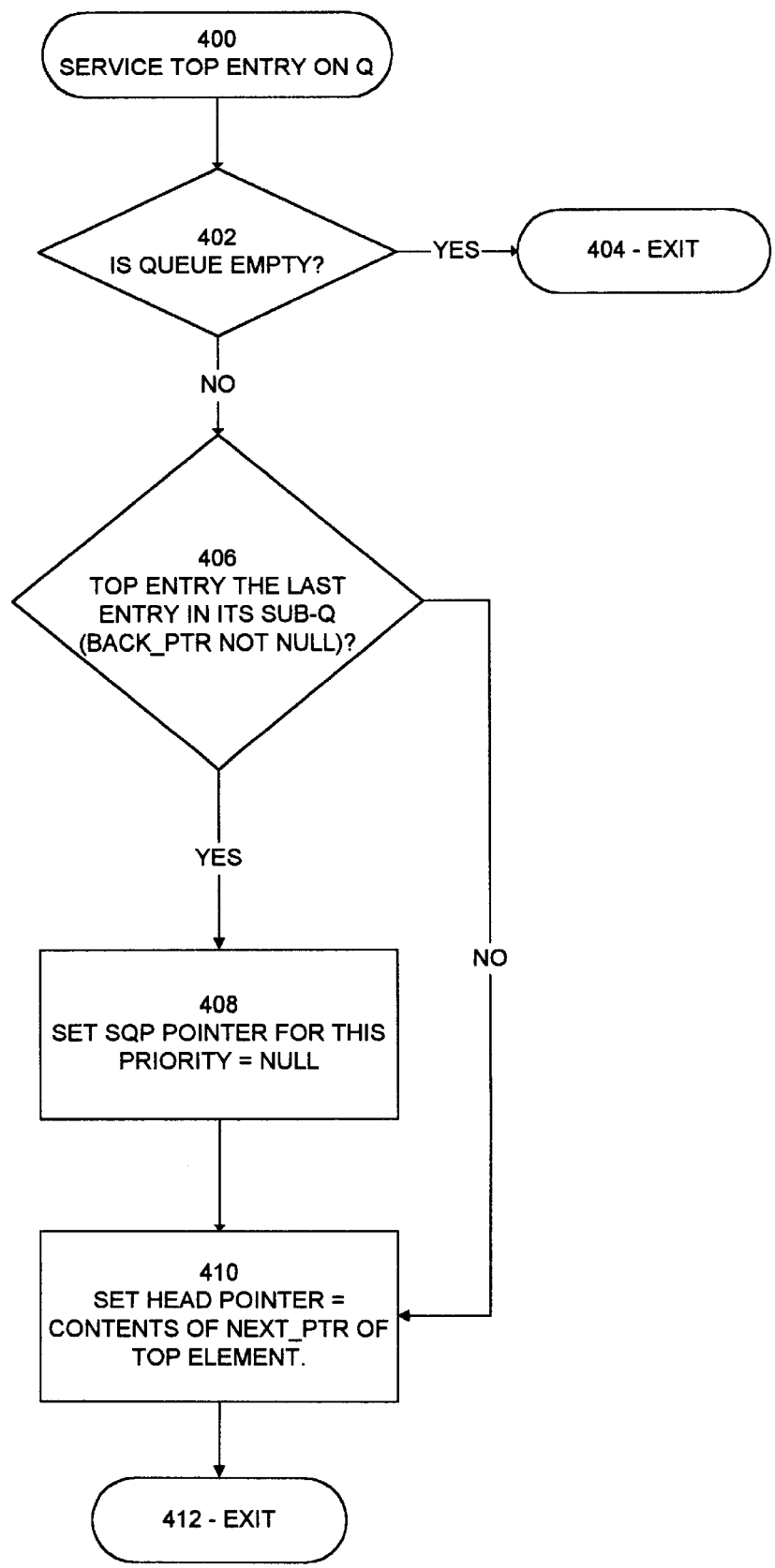
FIG. 4 contains an illustrative flowchart of steps that are performed in servicing (removing an element) the queue structure of FIG. 1.

FIG. 4 illustrates the steps required to service (remove entries from) the queue. The top entry of the queue is always serviced upon entry to 400 of FIG. 4. Step 402 determines if the queue is presently empty. If so, there is nothing to do and exit is made at step 404. If the queue is not empty, step 406 determines if the top entry is the last element in a subqueue. If BACK_PTR is not null in this top element, then it is the last entry of a subqueue. Assuming that this is the case, then step 410 effectively removes this top element from the queue 100 by setting HEAD POINTER 102 to the contents of the element's NEXT_PTR 114. This points HEAD POINTER 102 to the next element in the subqueue queue and that ends the operation. If the top entry is the last element in a subqueue at step 406, then step 408 clears the SQP pointer for this subqueue to indicate that the subqueue is empty. Step 410 sets HEAD POINTER 102 to the contents of NEXT_PTR of the element being removed. This operation initializes HEAD POINTER to point to the first element in the next subqueue, if such an element exists, or it nulls HEAD POINTER if the queue is now empty.

Of course, in all of the above operations that remove the top queue entry, that entry must be passed to a utilization routine or program. This operation is well known and omitted from the Figs. for simplicity.

It is to be understood that the above described arrangements are merely illustrative of the application of principles of the invention and that other arrangements may be devised by workers skilled in the art without departing from the spirit and scope of the invention.

I claim:

1. A method of administering a priority queue structure, wherein the structure includes a queue partitioned into subqueues corresponding to different priorities of elements to be serviced from the queue and ordered within the queue according to the respective priorities of the subqueues, wherein each element of the queue comprises a next pointer to the next element in the queue, if any, said method comprising the steps of determining the priority class of a new element arriving for insertion into the queue, locating the last entry of the subqueue corresponding to the determined priority class by addressing a priority pointer array that contains a pointer for each subqueue pointing to the last entry in the respective subqueue, inserting the new element as the last entry of the subqueue, and periodically servicing the priority queue by removing the top entry from the queue.

2. The method of claim 1 wherein each queue element further comprises a back pointer which for each last entry of a subqueue points to the respective entry in the priority pointer array and the step of inserting the new entry further comprises determining if the subqueue corresponding to the priority class of the new element is empty, if the subqueue is not empty, clearing the back pointer of the present last element of the subqueue, pointing the next pointer of the present last element of the subqueue to point to the new element, initializing the back pointer of the new element to point to the corresponding subqueue pointer of the priority pointer array and initializing the corresponding pointer of the priority pointer array to point to the new element.

3. The method of claim 1 wherein each queue element further comprises a back pointer which for each last entry of a subqueue points to the respective entry in the priority pointer array and the priority queue structure further includes a head pointer that points to the first element on the queue and the step of inserting the new entry further comprises determining if the subqueue corresponding to the priority class of the new element is empty, if the subqueue is empty, initializing the back pointer of the new element to point to the corresponding subqueue pointer of the priority pointer array and initializing the corresponding pointer of the priority pointer array to point to the new element, determining from the head pointer if the queue is empty, if the queue is empty, initializing the head pointer to point to the new element.

4. Apparatus for administering a priority queue structure, wherein the structure includes a queue partitioned into subqueues corresponding to different priorities of elements to be serviced from the queue and ordered within the queue according to the respective priorities of the subqueues, and further wherein each element of the queue comprises a next pointer to the next element in the queue, if any, comprising a priority pointer array containing a pointer for each subqueue that points to the last entry in its respective subqueue, means for determining the priority class of a new element arriving for insertion into the queue, means for determining from the priority pointer array the last element in the queue corresponding to the priority class of the new element, means for inserting the new element as the last entry of the subqueue corresponding to the priority class of the new element, and means for periodically servicing the priority queue by removing the top entry from the queue.

5. The apparatus of claim 4 wherein each queue element further comprises a priority counter field, said apparatus further comprising means for initializing the priority counter of a new element to a first priority value determined by a prescribed function of the priority class of the new element, said first priority value being one of a set of priority values that are defined to reside in the priority class of the new element, means for determining if the new element preempts a present element in the queue, and means for promoting the priority of a preempted element, wherein the means for promoting further comprises means for setting the priority value of the preempted element to a higher priority value, means for determining if the higher priority value of the preempted element is within the set of priority values that correspond to a higher priority class, and if so, means for relinking the preempted element into the subqueue corresponding to the priority class of the higher priority value.

6. The apparatus of claim 5 further comprising means for generating the value of the prescribed function=$3^{X-1}$, where X is the priority class of a new element, and the first priority value is the value calculated by the prescribed function.

7. The apparatus of claim 6 wherein the means for promoting a preempted element further comprises means for decrementing its present priority value by a prescribed amount.

8. The apparatus of claim 7 wherein the means for determining if the priority value of a promoted element resides in a higher priority class further comprises means for determining if the promoted priority value is equal to the value determined by the prescribed function for the higher priority class.

* * * * *